(12) United States Patent  
Fauconnier et al.

(10) Patent No.: US 9,234,455 B2
(45) Date of Patent: Jan. 12, 2016

(54) ACTUATING APPARATUS FOR A TURBINE OF AN EXHAUST GAS TURBOCHARGER

(71) Applicant: IHI CHARGING SYSTEMS INTERNATIONAL GMBH, Heidelberg (DE)

(72) Inventors: Vincent Fauconnier, Leimen (DE); Tim Lowak, Leimen (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 0 days.

(21) Appl. No.: 14/302,379

(22) Filed: Jun. 11, 2014

(65) Prior Publication Data

US 2014/0290240 A1    Oct. 2, 2014

Related U.S. Application Data

(63) Continuation-in-part of application No. PCT/EP2012/005084, filed on Dec. 8, 2012.

(30) Foreign Application Priority Data

Dec. 17, 2011 (DE) .......................... 10 2011 121 391

(51) Int. Cl.
| | |
|---|---|
| *F02D 23/00* | (2006.01) |
| *F16K 31/44* | (2006.01) |
| *F02B 37/18* | (2006.01) |
| *F01D 17/10* | (2006.01) |

(52) U.S. Cl.
CPC ............ *F02B 37/186* (2013.01); *F01D 17/105* (2013.01); *F05D 2220/40* (2013.01); *F05D 2260/50* (2013.01); *F05D 2260/96* (2013.01); *Y02T 10/144* (2013.01)

(58) Field of Classification Search
CPC . F02B 37/186; F01D 17/105; F05D 2260/96; F05D 2260/50
USPC ...................... 60/602; 251/279, 280, 291, 292
See application file for complete search history.

(56) References Cited

U.S. PATENT DOCUMENTS

2003/0196435 A1    10/2003 Heath

FOREIGN PATENT DOCUMENTS

| DE | 202014003919 U1 | * | 7/2014 | .............. F02B 37/18 |
| DE | 202013005225 U1 | * | 10/2014 | .............. F02B 37/18 |
| GB | 2 151 700 | | 7/1985 | |

* cited by examiner

*Primary Examiner* — Thai Ba Trieu
*Assistant Examiner* — Ngoc T Nguyen
(74) *Attorney, Agent, or Firm* — Klaus J. Bach

(57) ABSTRACT

In an actuating device for a turbine of an exhaust gas turbocharger for controlling the charging pressure of the exhaust gas turbocharger, wherein a valve of the exhaust gas turbocharger has an actuating shaft onto which a connecting arm is firmly mounted and is pivotally coupled to an actuating link via a connecting bolt by which the actuating shaft can be pivoted about an axis of rotation by a translatory motion of the actuating link, the actuating shaft and the connecting bolt are engaged via a single integral locking element for retaining the actuating link in engagement with the connecting bolt and the actuating shaft.

7 Claims, 2 Drawing Sheets

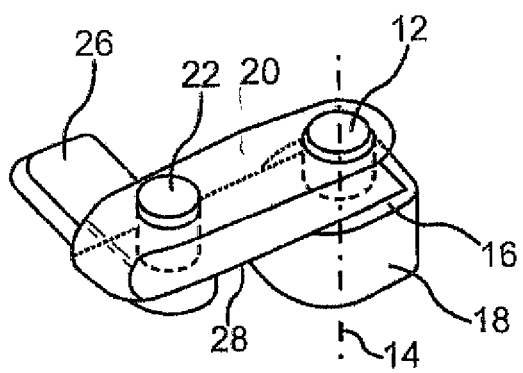
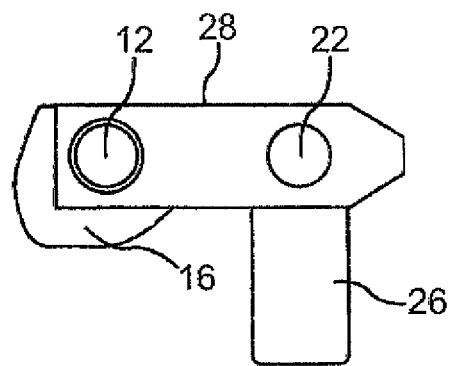
Fig. 1
Fig. 2
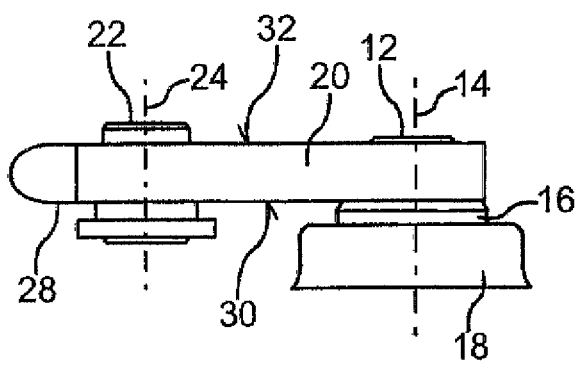
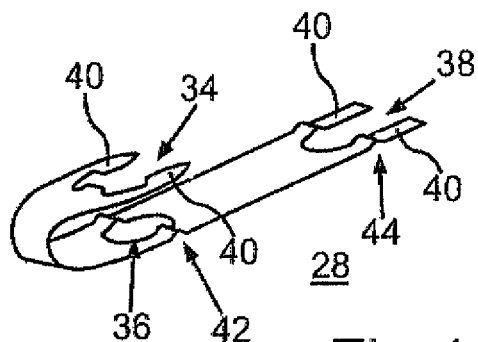
Fig. 3
Fig. 4

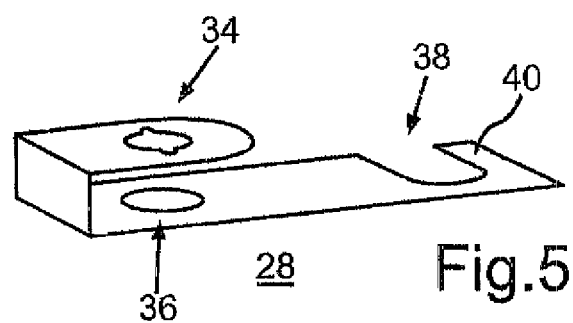
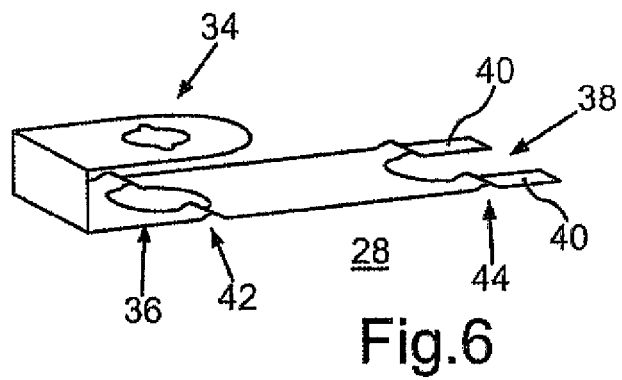

ACTUATING APPARATUS FOR A TURBINE OF AN EXHAUST GAS TURBOCHARGER

This is a Continuation-In-Part application of pending international patent application PCT/EP2012/005084 filed Dec. 8, 2012 and claiming the priority of German patent application 10 2011 121 391.4 filed Dec. 17, 2011.

BACKGROUND OF THE INVENTION

The invention relates to an actuating device for a turbine of an exhaust gas turbocharger particularly for controlling the charging pressure of the exhaust gas turbocharger.

Such an actuating device is disclosed for example in US 2003/0196435 A1. The actuating device which serves to control the charging pressure of the exhaust gas turbocharger comprises a first bolt element which is rotatable about an axis of rotation. A valve element, a so-called waste gate, of the turbine is movable between a closed position and at least one open position via the first bolt element.

In the open position, the valve element opens a bypass duct, a so-called waste gate duct. The exhaust gas may bypass a turbine wheel of the turbine via the bypass duct so that the turbine wheel is not driven by the exhaust gas. The output of the turbine and thus the charging pressure of the exhaust gas turbocharger may be controlled by opening and closing of the bypass duct.

The first bolt element is non-rotatably joined to a connecting element, in this case to a connecting plate. The connecting element is articulatedly joined to an actuating element via a second bolt element. Here, the actuating element and the connecting element are joined rotatably about another axis of rotation relative to each other, with the axis of rotation and the other axis of rotation extending at least essentially parallel to each other. The actuating element is movable at least essentially vertically and translatorily to the axis of rotation of the first bolt element.

By moving the actuating element translatorily, the first bolt element is rotated about its axis of rotation due to the connection of the actuating element with the connecting element as well as due to the connection of the connecting element with the first bolt element. This is accompanied by the movement of the valve element of the turbine.

It was found that in particular due to wear as well as due to manufacturing-related tolerances some play between the connecting element and the bolt elements may develop which results in the generation of noises.

It is therefore the object of the present invention to develop an actuating apparatus for a turbine of an exhaust gas turbocharger of the above mentioned type in such a manner that the turbine noises are at least reduced.

SUMMARY OF THE INVENTION

In an actuating device for a turbine of an exhaust gas turbocharger, for controlling the charging pressure of the exhaust gas turbocharger, wherein a valve of the exhaust gas turbocharger has an actuating shaft onto which a connecting arm is firmly mounted and is pivotally coupled to an actuating link by a connecting bolt via which the actuating shaft can be pivoted about an axis of rotation by a translatory motion of the actuating link, a single integral intermediate locking element is provided for retaining the actuating link in engagement with the connecting bolt and the connecting bolt in engagement with the connecting arm.

With this arrangement, the above mentioned generation of noise can be kept particularly low or be prevented. The intermediate element which is common to the bolt elements provides for a compensation of in particular manufacturing-related and wear-related tolerances and clearances between the bolt elements and the connecting element, so that in particular rattling of the inventive actuating device is reliably prevented even over a long life.

In addition, the integral intermediate locking element which is common to the bolt and actuating shaft may be easily and thus quickly and cost efficiently installed and arranged between the actuating arm shaft and the connecting bolt.

In another advantageous embodiment, at least one of the connecting bolt and the actuating shaft, in particular the connecting bolt, element is locked in place via the integral intermediate locking element. This provides for a fixed and defined support so that any relative movement between the connecting bolt and the connecting arm and also the link is eliminated, and also noise resulting from such relative movement may be avoided even over a long life.

When the integral intermediate element is attached at one of the connecting bolt and the actuating shaft, in particular the actuating shaft, the number of parts and thus the costs of the inventive actuating apparatus will be kept low. Additional and separate fastening means are not necessary. In particular in combination with the two-sided support of the connecting bolt and the actuating shaft the intermediate locking element may be firmly and reliably secured.

In another embodiment of the invention, the at least one of the connecting bolt and the actuating shaft is held in engagement with the connecting arm by means of the intermediate locking element. Therefore, the intermediate locking element does not only fulfill the support function and thus the compensation of tolerances and clearances, respectively, but also the function of fastening the connecting bolt element at the actuating link. By this integration of functions the number of parts, the costs and the weight of the inventive actuating device may be kept within a particularly narrow range.

It is in particular possible to advantageously compensate for even relatively large tolerances and clearances if the intermediate locking element comprises at least one protrusion which is raised relative to at least a partial area adjoining the protrusion of the intermediate locking element and via which the intermediate locking element supports resiliently the connecting arm at least at the connecting bolt elements and/or at the actuating shaft, in particular. The protrusion facilitates in particular to clamp or to bias, respectively, the intermediate locking element at least with the connecting bolt or the actuating shaft. Thereby, any relative movement and the resulting noise may be reliably prevented even for a long service life and operating periods with extreme temperature variations.

The protrusion is advantageously formed by means of a coating, in particular a protective coating, on the intermediate locking element. Therefore, the intermediate locking element can be manufactured cost efficiently. It may further be provided to form the protrusion by at least a fiber and/or similar material build-up.

In order to reliably compensate for clearances and tolerances, even with large temperature variations, the intermediate locking element is advantageously disposed resiliently at the connecting bolt and actuating shaft locations.

In another advantageous embodiment of the invention, the intermediate locking element comprises through-holes which are assigned to the respective connecting bolt and actuating shaft elements and which are penetrated by the associated connecting bolt and operating shaft in a respective passage direction. Thus, the intermediate locking element may easily be mounted by inserting the connecting bolt and the actuating shaft e. g. in the passage direction through the respective through-holes.

In another embodiment, at least one of the through-holes is provided with an opening in the circumferential area, via which the associated bolt element may be inserted under an angle, in particular vertically, to the passage direction into the through-hole. This is beneficial for a particularly easy, quick and cost efficient installation, which keeps the costs of the actuating apparatus and thus of the entire turbine particularly low.

The intermediate locking element may be formed from a metallic material. There-fore, it has advantageous, in particular resilient, properties and can also at least essentially withstand large temperature variations without being damaged. The intermediate locking element is e. g. formed as a sheet metal strip.

The intermediate element may also be formed from a synthetic material. This results in a particularly low weight of the intermediate element and thus of the actuating apparatus.

Further advantages, features and details of the invention will become apparent from the following description of a preferred exemplary embodiment with reference to the accompanying drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention.

BRIEF DESCRIPTION OF THE DRAWINGS

FIG. 1 shows a schematic perspective view of an actuating apparatus for a turbine of an exhaust gas turbocharger, via which a bypass valve for a bypass duct of the turbine is adjustable and which exhibits a particularly advantageous noise behavior;

FIG. 2 shows a schematic plan view of the actuating apparatus according to FIG. 1;

FIG. 3 shows a schematic side view of the actuating apparatus according to FIGS. 1 and 2;

FIG. 4 shows a schematic perspective view of an intermediate element of the actuating apparatus according to FIGS. 1 to 3;

FIG. 5 shows a schematic perspective view of another embodiment of the intermediate element according FIG. 4; and FIG. 6 shows a schematic perspective view of another embodiment of the intermediate element according to FIGS. 4 and 5.

DESCRIPTION OF EXEMPLARY EMBODIMENTS

FIGS. 1 to 3 show an actuating apparatus 10 for a turbine of an exhaust gas turbocharger. The exhaust gas turbocharger serves, for example, to charge a combustion engine of an automobile. The exhaust gas turbocharger comprises a compressor with a compressor wheel by means of which air to be supplied to the combustion engine is to be compressed. The compressor may be driven via the turbine of the exhaust gas turbocharger.

For this purpose, the turbine comprises a turbine casing with a housing space in which a turbine wheel of the turbine is at least partially accommodated rotatably about an axis of rotation of the turbine wheel relative to the turbine casing.

The turbine casing further comprises at least one supply duct via which exhaust gas of the combustion engine may be supplied to the turbine wheel. The exhaust gas can flow into the turbine wheel and drive it. The turbine wheel is connected non-rotatably with a shaft of the exhaust gas turbocharger, with which the compressor wheel, too, is non-rotatably connected. Thereby, the compressor wheel is driven by the turbine wheel.

For controlling or regulating, respectively, of the charging pressure of the exhaust gas turbocharger which may be provided by the compressor, the turbine comprises at least one bypass duct. By means of the bypass duct, exhaust gas may be branched off upstream of the turbine wheel and be guided past the turbine wheel. In other words, the exhaust gas flowing through the bypass duct may bypass the turbine wheel without flowing into the turbine wheel and driving it.

For controlling the quantity or mass, respectively, of the exhaust gas flowing through the bypass duct a valve element, a so-called waste gate valve, is provided which may be adjusted between a closed position and at least one open position. In the closed position, the bypass duct is fluidly blocked so that no exhaust gas may flow into the bypass duct and bypass the turbine wheel.

In the at least one open position, the bypass duct is at least partially fluidly open so that exhaust gas may flow into the bypass duct and bypass the turbine wheel.

Here, the valve element is adjustable via the actuating apparatus 10. The actuating apparatus 10 comprises an arm shaft 12 which penetrates the turbine casing and is non-rotatably connected with the valve element. The lever arm shaft 12 is rotatable about a lever arm shaft axis of rotation 14 relative to the turbine casing. For providing high functional reliability, a bearing sleeve 16 is provided via which the arm 12 is rotatably supported at the turbine casing. Moreover, a housing 18 is provided in which the lever arm shaft 12 is supported and which e. g. prevents a leakage of media such as exhaust gas, oil or the like from the turbine casing.

The actuating apparatus 10 further comprises a connecting arm 20 with a first through-hole which is penetrated by the lever arm shaft 12. In other words, the lever arm shaft 12 is installed in the first through-hole of the connecting arm 20. Here, the connecting plate 20 is non-rotatably connected with the lever arm haft 12.

The actuating apparatus 10 also comprises a connecting bolt 22 which penetrates a second through-hole of the connecting arm 20. In other words, the connecting bolt 22 is installed in the second through-hole of the connecting arm 20. The connecting bolt 22 is articulatedly connected with the connecting arm 20. This means that the connecting bolt 22 is connected with the connecting arm 20 rotatably about a connecting bolt axis of rotation 24 relative to the connecting arm 20.

As can be seen in particular from FIG. 3, the lever arm shaft axis of rotation 14 and the connecting bolt axis of rotation 24 extend at least essentially parallel to each other.

The connecting bolt 22 is non-rotatably connected with an actuating link 26. The actuating link 26 is provided with a third through-hole in which the connecting bolt 22 is installed.

Alternatively it may be provided that the connecting bolt 22 is non-rotatably connected with the connecting arm 20 and connected with the actuating link 26 rotatably about the connecting bolt axis of rotation 24 relative to the actuating link 26.

The actuating link 26 is at least essentially normally and translatorily movable relative to the lever arm shaft axis of rotation 14 and the connecting bolt axis of rotation 24 and is articulatedly connected with the connecting 20 via the connecting bolt 22. For a translatory movement or shifting, respectively, of the actuating link 26, it is at least indirectly connected with a pressure sensor of the exhaust gas turbocharger.

When the valve element is e. g. in its closed position in which at least essentially the entirety of the exhaust gas flows to the turbine wheel driving it, and when the charging pressure of the exhaust gas turbocharger exceeds a predetermined threshold value, a diaphragm of the pressure sensor is caused to move. The movement of the diaphragm is transferred to the actuating link 26 so that the actuating link 26 is translatorily moved. Due to the described coupling of the actuating link 26 with the lever arm shaft 12 as well as due to the coupling of the lever arm belt shaft 12 with the valve element, the translatory movement of the actuating link 26 is transformed to a rotational movement of the lever arm shaft 12 about the lever arm bolt axis of rotation 14 and further to a swiveling motion of the valve element from its closed position to its open position.

In order to avoid undesired relative movements of the connecting arm 20 relative to the lever arm shaft 12 and relative to the connecting bolt 22, an intermediate locking element 28 illustrated in FIG. 4 is provided. The intermediate element is integrally formed and arranged in the direction of the lever arm shaft axis of rotation 14 or of the connecting bolt axis of rotation 24, respectively, between the connecting arm 20 and the lever arm shaft 12 and between the connecting arm 20 and the connecting bolt 22. In other words, both the lever arm shaft 12 and the connecting bolt 22 are secured on the connecting arm 20 via the integral intermediate locking element 28. This provides for the compensation of manufacturing-related and/or wear-related tolerances or clearances, respectively, or clearances between the connecting arm 20 and the lever arm shaft 12, or the connecting bolt 22, respectively, so that relative motion between the connecting arm 20 and the lever arm shaft 12 and the connecting bolt 22, respectively, and the noise resulting therefrom may be avoided or minimized.

As can be seen in particular from FIG. 3, the intermediate locking element 28 is arranged at a first side 30 of the connecting arm 20 between the lever arm bolt 12 and the connecting arm 20 and between the connecting bolt 22 and the connecting arm 20. In addition, the intermediate locking element 28 is also arranged at a second side 32 of the connecting arm 20 facing away from the first side 30 between the connecting arm 20 and the connecting bolt 22. Thereby, a particularly strong and advantageous connection of the connecting bolt 22 with the connecting arm 20 is implemented. In other words, the connecting arm 20 is secured at the connecting bolt 22 by means of the intermediate locking element 28 and vice versa, respectively.

The integral nature of the intermediate locking element 28 enables a quick and cost efficient assembly. Further, clearance and tolerance compensation is effected at all connecting points of the actuating apparatus 10 which may be prone to clearances by means of the only one integral intermediate locking element 28. This also contributes to low wear of the actuating apparatus 10. The intermediate locking element 28 also enables advantageously to avoid or minimize the generation of noise upon an excitation of the actuating apparatus 10.

As can be seen in particular from FIG. 4, the intermediate locking element 28 comprises a first through-hole 34 in which the connecting bolt 22 is received at the second side 32. Starting from the first through-hole 34, the intermediate locking element 28, which in the present case, is formed as a sheet metal strip extends around the connecting arm 20 to the first side 30, where the intermediate locking element 28 comprises a second through-hole 36 for receiving the connecting shaft 22 at the first side 30.

The intermediate locking element 28 further comprises a third through-hole 38 in which the lever arm shaft 12 is installed at the first side 30.

The through-holes 34, 36, 38 each have a passage direction, in which they are penetrated by the connecting bolt 22 or the lever arm shaft 12, respectively. While the second through-hole 36 is completely closed in the circumferential direction the through-holes 34, 38 comprise respective openings in the circumferential direction. It is e. g. possible to insert the lever arm shaft 12 into the third through-hole 38 vertically to its passage direction via the opening of the third through-hole 38. In other words, the intermediate locking element 28 may be mounted vertically to the passage direction of the third through-hole 38 onto the lever arm shaft 12.

This may apply analogously for the first through-hole 34 into which the connecting bolt 22 may be inserted vertically to the passage direction of the first through-hole 34. On the other hand, this means that the intermediate element 28 may be mounted vertically to the passage direction of the first through-hole 34 onto the connecting bolt 22.

The through-holes 34, 38 which are open in the circumferential direction are defined by respective straps 40 of the intermediate locking element 28, which may encompass the connecting bolt 22 or the lever arm shaft 12, respectively, in particular resiliently. Thereby, the intermediate element 28 is reliably secured both at the connecting bolt 22 and the lever arm shaft 12.

The first through-hole 34 of the intermediate locking element 28 according to FIGS. 5 and 6 is also completely closed in the circumferential direction so that the connecting bolt 22 may be inserted into the through-holes 34, 36 in the passage direction.

The intermediate locking element 28 also comprises first protrusions 42 and second protrusions 44. The protrusions 42, 44 are raised relative to the partial areas adjoining the protrusions 42, 44 of the relatively thin-walled intermediate locking element 28. The first protrusions 42 are assigned to the connecting bolt 22, while the second protrusions 44 are assigned to the lever arm shaft 12. The intermediate locking element 28 is supported on the first side 30 at the connecting arm 20 via the first protrusions 42. Correspondingly, the intermediate locking element 28 is supported on the first side 30 at the connecting arm 20 via the second protrusions 44. Because the intermediate locking element 28 is also supported at the connecting bolt 22 and at the lever arm shaft 12 the intermediate locking element 28 may be particularly firmly clamped between the connecting arm 20 and the lever arm shaft 12, and the connecting bolt 22, respectively, by means of the protrusions 42, 44 so that the connecting arm 20 is positively and advantageously engaged with the lever arm bolt 12 and the connecting bolt 22. This provides for an efficient and effective compensation for clearances and/or tolerances.

Alternatively or additionally the intermediate locking element 28 may also be supported via at least one corresponding protrusion at the connecting bolt 22 and/or via at least one corresponding protrusion at the lever arm shaft 12.

The protrusions 42, 44 are formed e. g. by stamping or the like of the sheet metal strip. The protrusions 42, 44 may, however, be also formed by a material build-up, e. g. by means of a coating, at least a fiber or a similar material build-up of the intermediate locking element 28.

FIGS. 5 and 6 show further embodiments of the intermediate locking element 28, which are adapted to specified installation conditions or installation conditions which may be predetermined, respectively.

What is claimed is:

1. An actuating device (10) for a turbine of an exhaust gas turbocharger for controlling a charging pressure of the exhaust gas turbocharger, the turbine having a valve with an actuating shaft (12), which is rotatable about an axis of rotation (14) for actuating the valve between a first position and a second position, the actuating device comprising a connecting arm (20) coupled at one end thereof to the actuating shaft (12) for rotation therewith, an actuating link (26) coupled to the connecting arm (20) by a connecting bolt (22) mounted on the actuating link (26) and extending through an opening in the connecting arm (20) along an axis which extends parallel to the axis of rotation (14) of the actuating arm shaft (12), the actuating shaft (12) being rotatable about its axis of rotation (14) by translatory motion of the actuating link (26), the connecting arm (20) being held in engagement with actuating shaft (12) and with the connecting bolt (22) by an integral intermediate locking element (28) extending along a first side 30) of the connecting arm (20), one of the actuating shaft (12) and the connecting bolt (22) being engaged, at a second side (32) of the connecting arm (20) facing away from the first side (30) of the connecting arm (20), by the intermediate locking element (28) for retaining the connecting arm (20) in engagement with the connecting bolt (22) and, via the connecting bolt (22), with the actuating link (26).

2. The actuating device (10) according to claim 1, wherein the integral intermediate locking element (28) is secured at one of the actuating shaft (12) and the connecting bolt (22).

3. The actuating device (10) according to claim 1, wherein the intermediate locking element (28) comprises at least one protrusion (42, 44) which is raised relative to at least one partial area of the intermediate locking element (28) adjoining the at least one protrusion (42, 44) and via which the intermediate locking element (28) is engaged by at least one of the actuating shaft (12) and the connecting bolt (22) and extends along the connecting arm (20).

4. The actuating device (10) according to claim 3, wherein the at least one protrusion (42, 44) is formed by a deposit on the intermediate element (28).

5. The actuating device (10) according to claim 3, wherein the intermediate locking element (28) is resiliently engaged at least at one of the actuating shaft (12) and the connecting bolt (22) for retaining the connecting arm (20).

6. The actuating device (10) according to claim 1, wherein the intermediate locking element (28) comprises through-holes (36, 38, 40) for accommodating the actuating shaft and, respectively, the connecting bolt (22).

7. The actuating device (10) according to claim 6, wherein at least one of the through-holes (36, 38, 40) has a side opening in the circumferential direction, via which the associated actuating shaft (12) is engaged by a sideward movement of the intermediate element (28) into engagement with the respective actuating shaft (12) in a direction normal to the axis of rotation (14) of the actuating shaft.

\* \* \* \* \*